(12) United States Patent
Leyns et al.

(10) Patent No.: US 7,506,472 B2
(45) Date of Patent: Mar. 24, 2009

(54) WORK HANDLING

(75) Inventors: Frederik Leyns, Oosterzele (BE); Willy Dillen, Sint-Amandsberg (BE)

(73) Assignee: CropDesign, N.V. (BE)

( * ) Notice: Subject to any disclaimer, the term of this patent is extended or adjusted under 35 U.S.C. 154(b) by 0 days.

(21) Appl. No.: 10/740,028

(22) Filed: Dec. 18, 2003

(65) Prior Publication Data

US 2004/0200146 A1 Oct. 14, 2004

(30) Foreign Application Priority Data

Dec. 23, 2002 (EP) .................................. 02080540

(51) Int. Cl.
*A01G 9/10* (2006.01)
(52) U.S. Cl. .................................... 47/1.01 P
(58) Field of Classification Search ............... 47/1.01 P, 47/48.5, 17, 65
See application file for complete search history.

(56) References Cited

U.S. PATENT DOCUMENTS

| 4,015,366 | A | * | 4/1977 | Hall, III ........................ 47/1.43 |
| 4,481,893 | A | | 11/1984 | Qvarnstrom |
| 5,247,761 | A | * | 9/1993 | Miles et al. ............... 47/1.01 R |
| 5,878,527 | A | * | 3/1999 | Valstar ....................... 47/62 C |
| 6,164,537 | A | | 12/2000 | Mariani et al. |
| 6,701,665 | B1 | * | 3/2004 | Ton et al. .................. 47/58.1 R |
| 7,403,855 | B2 | | 7/2008 | Fuessley et al. |
| 2003/0174046 | A1 | * | 9/2003 | Abrams ..................... 340/5.92 |
| 2004/0201454 | A1 | * | 10/2004 | Waterhouse et al. ........ 340/10.1 |

FOREIGN PATENT DOCUMENTS

| DE | 199 50 532 | | 8/1990 |
| DE | 39 06 215 | | 7/1992 |
| DE | 199 20 920 | | 11/2000 |
| EP | 1 157 961 | | 11/2001 |
| FR | 2709636 | A1 * | 3/1995 |
| GB | 1 576 010 | | 10/1980 |

\* cited by examiner

*Primary Examiner*—T. Nguyen
(74) *Attorney, Agent, or Firm*—Connolly Bove Lodge & Hutz LLP

(57) ABSTRACT

Appartus suitable for use in conjunction with a container in which one or more plants is growing and associated with it a device for recieving an enquiry signal and automatically responding by transmitting an unique identifier signal the apparatus comprising
  (a) transporter means by which a container may be supported for moving the container,
  (b) means for transmitting the enquiry signal,
  (c) means for recording the identifier signal as a digital output and
  (d) computer means to which the digital output is supplied for storage of the data in prescribed format in a database for manipulation to afford comparsion of data related to the container.

17 Claims, 6 Drawing Sheets

WORK HANDLING

This invention relates to handling of containers in which one or more plants is growing and is especially concerned with automated handling of plant pots in a greenhouse.

Plants grown in greenhouses are amenable to automated handling because they are usually grown in containers such as pots that can be easily transported to and from automation devices. Greenhouses can be equipped with automated systems for transporting plants in and out of the growing area in the greenhouse. Automation is an attractive option in greenhouses because it permits reduction in labour costs whilst rendering particular operations more uniform, reliable and less error-prone and allowing speed-up of the execution of particular tasks. In order for automation to run in a reliable, efficient and unattended way, plants must be identifiable by the automation devices.

Identification of plants in the horticultural industry is a common practice. The most widely used identification systems are either colored labels, text-printed labels or bar-coded labels.

As automated transporting systems become more sophisticated, the need increases for a system that accurately provides an on-line overview on where plants (or plant batches) are standing in the greenhouse and characteristics of those plants.

It is one object of the invention to provide improved apparatus and/or process for handling of containers containing plants.

It is another object of the invention to provide apparatus and or process for improved breeding of plants.

It is another object of the invention to provide improved apparatus and/or process for conducting an operation to obtain digital images of plants.

The invention provides in one of its aspects apparatus suitable for use in conjunction with a container in which one or more plants is growing and having associated with it a device for receiving an enquiry signal and automatically responding by transmitting an unique identifier signal the apparatus comprising
  a) transporter means by which a container may be supported for moving a container,
  b) means for transmitting the enquiry signal,
  c) means for recording the identifier signal as a digital output and
  d) computer means to which the digital output is supplied for storage of the data in prescribed format in a database for manipulation to afford comparison of data related to the container.

The word |comprising| where used herein is intended to encompass the notion of |including| and the notion of |consisting essentially of|.

In apparatus according to the invention the enquiry and identifier signals are preferably radio signals. Conveniently, the device for receiving an enquiry signal and automatically responding by transmitting an unique identifier signal consists of a copper coil, which acts as a small antenna and a chip, which stores information. Such devices are hereinafter referred to as transponders. The means for transmitting the enquiry signal comprises one or more transmitters located at known positions. Preferably the, or each transmitter comprises a larger aerial and sends radio waves towards the transponder. The small antenna of the transponder captures this and uses the energy generated for its own response. The transponder chip recognizes the radio signal and transmits its unique identifier signal by sending information programmed in it. This could be a simple unique code but also more information if the chip is equipped for this, but we have found that transponders of a very simple type are sufficient. The unique identifier signal is captured by one or more of the aerials of the transmitters, which sends this identifier to the computer means.

In one preferred apparatus arranged to support an array of containers in the form of pots containing plants, several transmitters are employed at known locations and the apparatus and its computer means is organized to enable identification of the location of the pot. In this preferred apparatus the transporter means comprises a plurality of co-extensive storage transporters each providing support for a row of several pots, the storage transporters being disposed adjacent one another to support rows of pots in a horizontally disposed array. Each storage transporter comprises a channel member secured in desired parallel relation to adjacent channel members and an endless belt located with an upper surface lying in the channel member and arranged to be drawn along the channel. Each belt supports a row of closely spaced pots. In this preferred apparatus, the channel members are situated with their end portions proximate to transfer conveyor means in the form of a belt conveyor located transversely to the channel members to accept or deliver pots from or to the belts. Preferably the apparatus comprises means for operating the belts as desired. When a belt is moved in one direction, the row of pots supported on that belt is moved towards a first transfer station at which an endmost pot of the row is transferred to the transfer conveyor. When moved in the other direction the belt moves the row of pots supported on that belt away from the transfer conveyor. Preferably, the apparatus comprises means for operating the transfer conveyor to move a pot supported on it to the second transfer station or to a workstation from which it may be transferred onto another storage transporter belt. In this preferred form of apparatus shuttle robots are employed to actuate movement of the belts in the channel members. The shuttle robots actuate the belts and by doing so they allow the plants to be transported to or from the transfer conveyor belt. Aerials of the transmitters are mounted on the shuttle robots and transmit to the computer means information about the identity of the channel member in front of which they are standing. Transponder readers on the shuttle robots transmit to the computer means information about which transponder-tagged plant pots are passing by the robot. The combined information on channel member and the identity of the pots allows to reconstruct an on-line overview of where each plant is located on the transporter means. Apparatus according to the invention may be arranged so that the shuttle robots are actuated in response to data contained in the database so as to move a pot from one location to another.

This preferred form of apparatus thus embodies a warehousing system for plants (for example in a greenhouse) that provides an on-line overview of the location of individual plants in the array of plants. The principle of the system is that each plant container is labeled with a transponder and that these transponders are read by transponder readers positioned along the transporting system. The information on the geographical location of the readers together with the identity of the transponders that pass by the readers permit an overview of the position of the plants in the greenhouse.

Apparatus according to the invention may comprise a workstation at which an operation is performed on the plant or plants in the container and if desired the operation may be performed automatically. Individual identification of plants allows for automated handling to be differentiated according to the plant's identity, and furthermore allows to keep track of the history of particular handlings for each individual plant. Examples of automatic operations for plant handling in a greenhouse setting include transplanting of young plants from smaller to larger containers, sorting of plants according to particular morphological parameters (e.g. size), pruning of plants, harvesting of particular parts of plants (e.g. flowers, fruits, seeds, leaves), supporting plants with the aid of sticks planted in the container and packaging of plants or plant containers. In one aspect, transmission of the identifier signal of the container presented at the workstation may actuate the means for performing the operation.

A second preferred apparatus hereinafter described comprises a workstation at which an imaging operation is performed on the plant or plants in the container. In this apparatus, transmission of the identifier signal by the transponder of the container presented at the workstation actuates the imaging means for performing the operation.

The apparatus comprises transporter means by which a container in the form of a pot containing a plant is moved through an imaging cabinet. The imaging cabinet is shielded from natural daylight. Light inside the imaging cabinet is provided by a standardized set of lamps of which the light intensity can be controlled. A pusher device at the workstation, inside the cabinet pushes the pot and its plant from the conveyor belt onto a required position on an imaging platform. A transponder reader antenna is mounted in such a way that it only reads the transponder of a pot positioned on the imaging platform. The reader of the transponder sends a signal to the software system that controls digital cameras in the imaging cabinet and thus activates the cameras to take a series of pictures. These pictures are processed on-line using imaging analysis software to extract information on the plants (e.g. height of the plants on the images, number of green pixels, etc.) and the processed data as well as the images get linked to the transponder tag unique identifier and downloaded to the computer. After the images have been captured, a picking device pushes the plant from the imaging platform onto a conveyor belt of the transporter means which transports the plants out of the imaging cabinet. The speed at which plants are handled in the imaging cabinet can be controlled by adjusting the speed of the conveyor belts and the picking devices.

The imaging device described above could be combined with other automation devices such as for instance a "sorting device" that sorts plants according to parameters derived from the digital images (e.g. plant height). Other automation devices could perform particular actions on transponder-tagged plants and such actions (e.g. pruning, harvesting, packaging, etc.) could be differentiated according to the information linked in a database to the transponder tag of the pot in which the plant is growing.

This apparatus operates in an unattended and fully automated way. It may be used in the phenotype of plants for breeding purposes. One may determine phenotype parameters of plant growth for example, area, height, width, number of leaves, number of inflorescences and branching pattern in an objective and quantifiable way. Thus, plants with particular morphological parameters (that can be derived from digital images) may be selected from a population of plants with different genetic constitution. The apparatus may be used without human intervention, and plants may be imaged at a high throughput rate, thus allowing not only imaging of a large population of plants in a short period of time, but also repeated imaging of the same population of plants so that evolution of the parameters over time may be recorded, both of which are desirable in plant breeding. Information derived from the digital images is collected for each individual plant from the population, and stored to allow for downstream data analysis. The unique identifier of each container and the information derived from each plant may be unambiguously linked to this identifier in the computer means. Preferably the information is stored as such (information on a particular plant linked to identification tag of the plant) in a digital database.

The automation devices described handle plants as individuals in a pot tagged with a transponder. Plants can also be handled batch-wise in which case the transponders label the batch of plants rather than the individual plant. For instance, plants can be grown with several individuals in a large pot or in a tray or in a tray consisting of physically connected pots. In this case the transponder is positioned in the container (large pot, tray, set of connected pots) in which the batch of plants is grown.

The invention provides in another of its aspects a method for relocating a container in which one or more plants is growing within a group of such containers in accordance with desired criteria comprising supporting the containers with transporter means comprising a plurality of storage transporters each providing support for a row of several containers in a horizontally disposed array, and a transfer conveyor, there being means for operating each storage transporter to move the row of containers supported on that transporter towards a first transfer station at which an endmost container of the row may be transferred to the transfer conveyor means, the method comprising associating with each container a device which, in response to receipt of an enquiry signal automatically transmits an unique identifier signal, emitting enquiry signals from known locations and recording the enquiry and identifier signals as digital output in a database in prescribed format to identify the location of the container.

The invention provides in another of its aspects a method for imaging and recording characteristics of a plant presented at an operating station comprising associating with the plant a device for receiving an enquiry signal and automatically responding thereto by transmitting an unique identifier signal, passing the container automatically to a workstation at which there is located means for transmitting the enquiry signal, causing the identifier signal to actuate means for imaging the plant and transferring the identifier signal and digital image information as digital output to a database for recording in prescribed format for manipulation according to desired characteristics.

The invention provides in another of its aspects a container (suitable for use in apparatus according to the invention or in a method according to the invention) comprising a container charged with a medium for growing a plant, a single plant rooted in the medium and a transponder supported in or on the container.

The invention provides in another of its aspects, the use of apparatus according to the invention in a greenhouse for the breeding of plants.

In order that the invention may become more clear there now follows a description to be read with the accompanying drawings of two preferred apparatuses according to the invention selected for description to illustrate the invention by way of example. In the drawings, FIG. 1 is a view of a plant pot containing a transponder for use in the invention;

Figure 1:
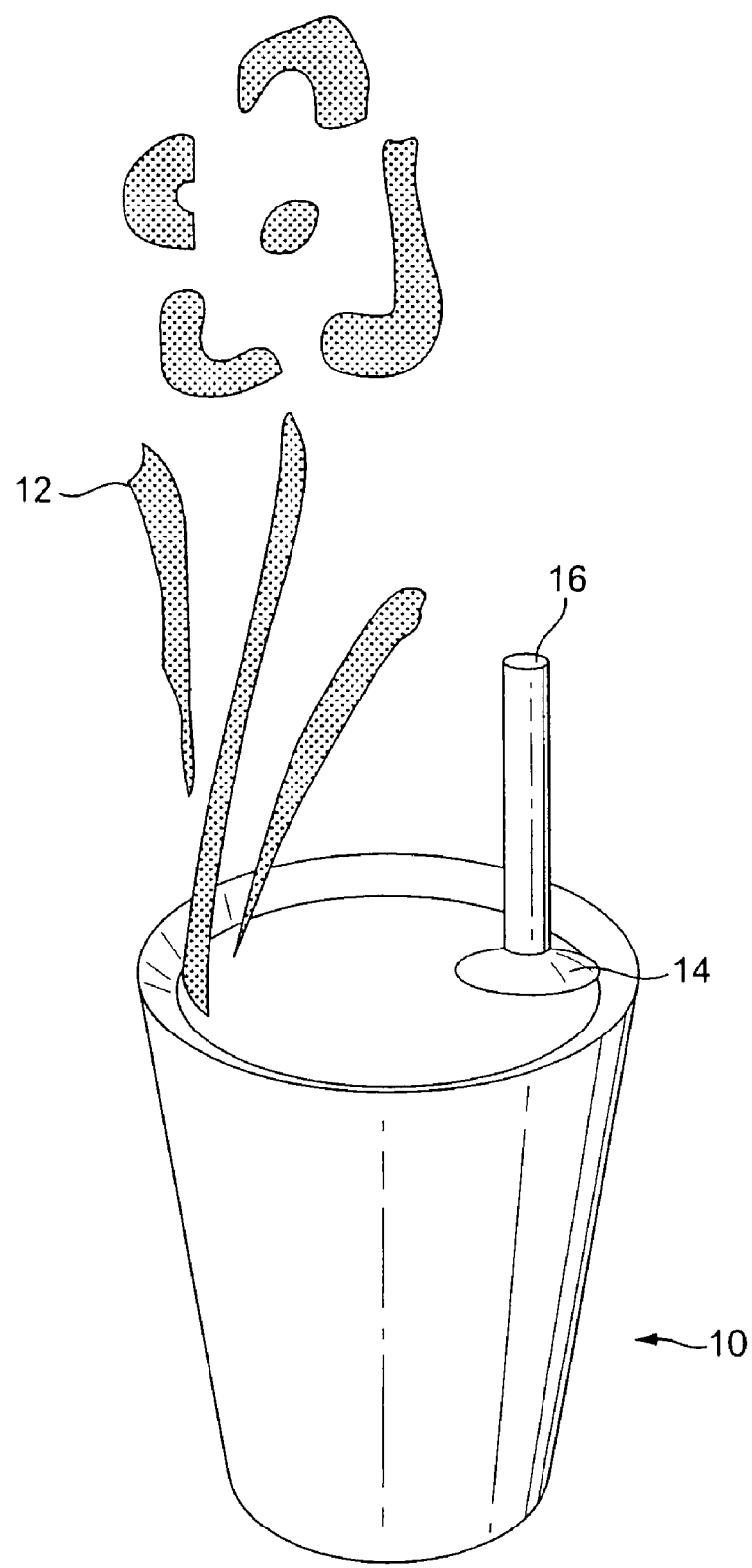

The first illustrative apparatus is suitable for use in conjunction with a plurality of containers in the form of plant pots (10) (FIG. 1) in which one or more plants (12) is growing in a soil selected for the purpose. Each pot contains a transponder disc device (14) packaged in a plastic wafer and is held in the soil by a peg (16). Each transponder (14) consists of a copper coil, which acts as a small antenna and a chip, which stores information and is arranged for receiving an enquiry signal and automatically responding by transmitting an unique identifier signal. Several transmitters are employed for transmitting enquiry signals to which the transponder discs (14) respond. The apparatus also comprises means for recording the identifier signal as a digital output and computer means (not shown) to which the digital output is supplied for storage of the data in prescribed format in a database from which it may be manipulated to afford comparison of data related to the pots.

Figure 2:
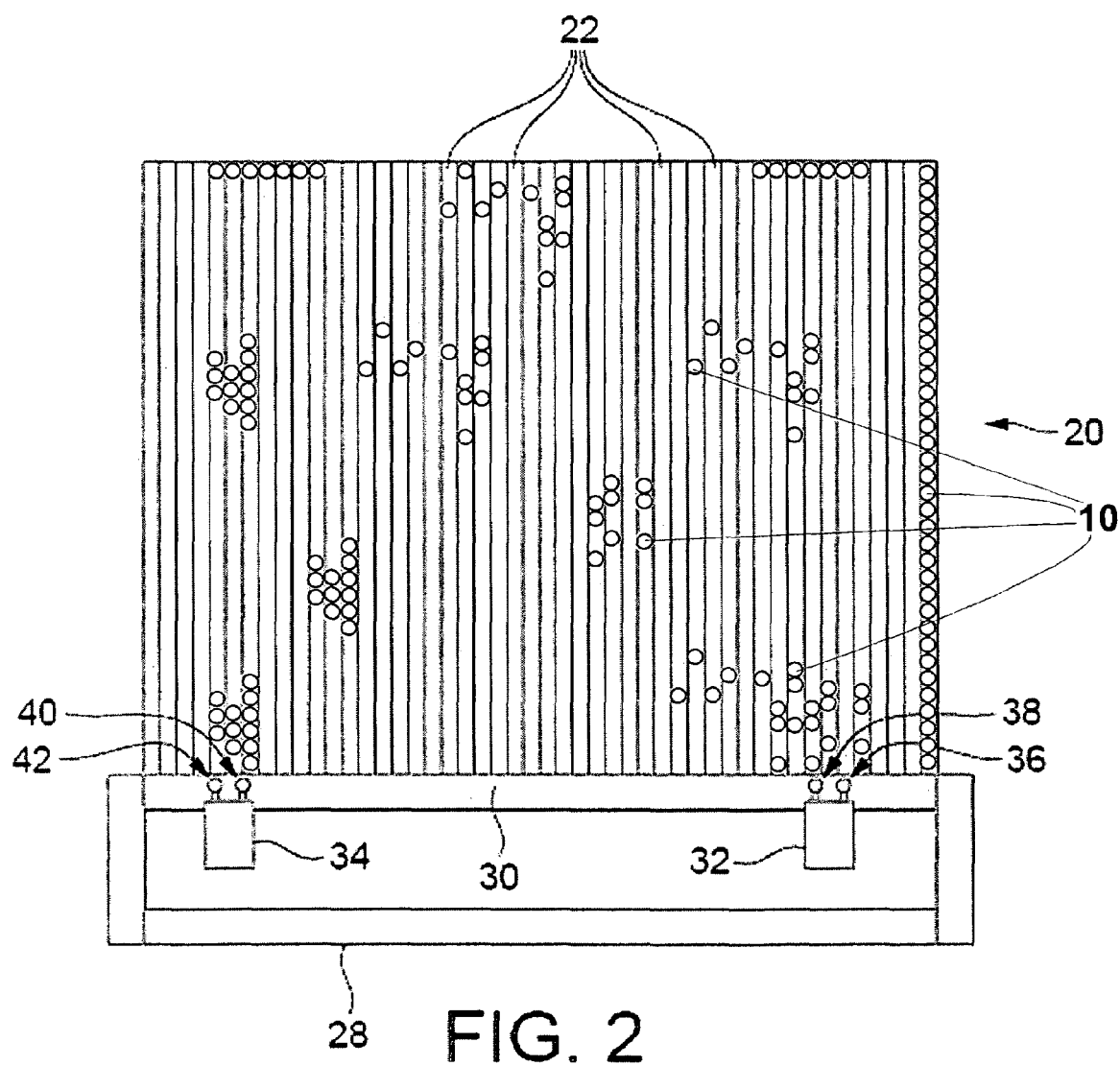
FIG. 2 is a schematic representation of transporter means of the first illustrative apparatus.
Figure 3:
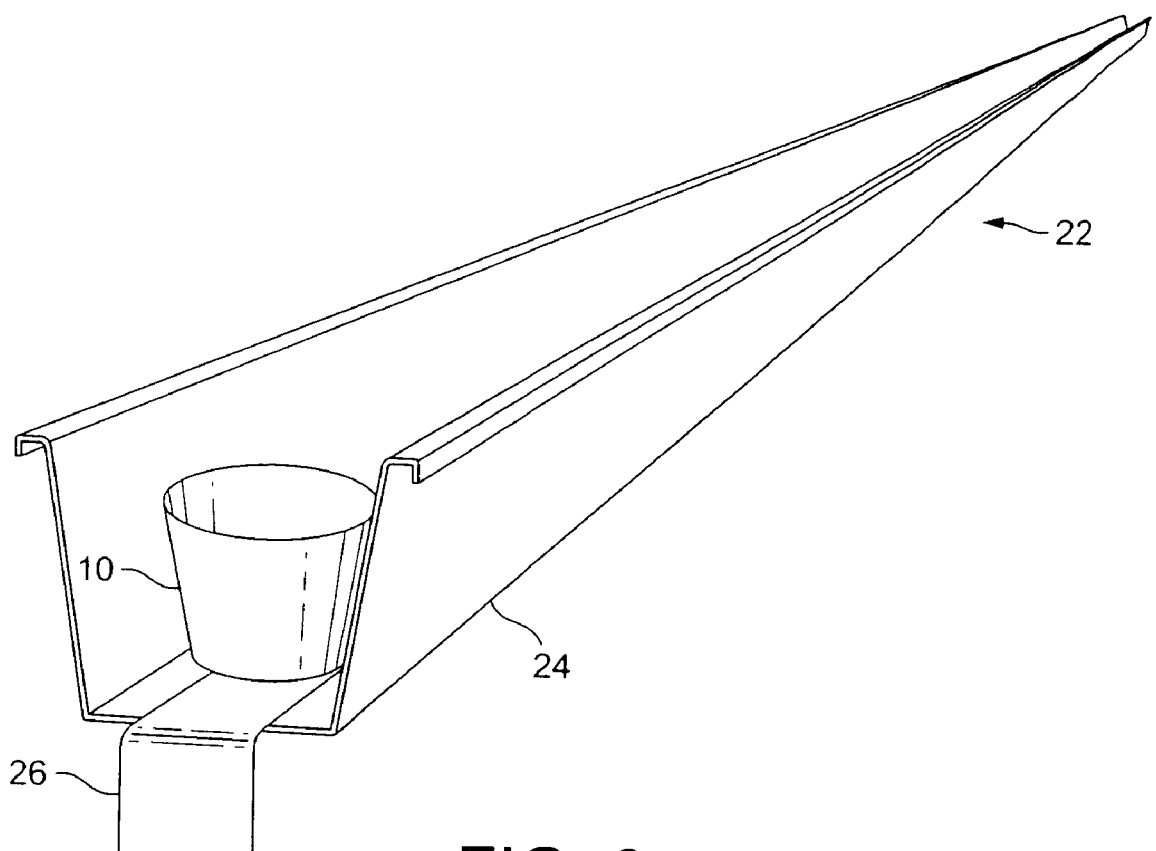
FIG. 3 is a view in perspective of a channel member and conveyor belt of the transporter means supporting a plant pot.

The apparatus comprises transporter means (20) (FIG. 2) by which the pots are supported and moved as desired. The transporter means (20) comprises a plurality of co-extensive storage transporters (22) each providing support for a row of several pots, the storage transporters being disposed adjacent one another to support rows of pots in a horizontally disposed array. Each storage transporter (22) comprises a channel member provided by a rigid |U|-shaped gutter (24) secured in parallel relation next to adjacent gutters. An endless belt (26) operates within each gutter (FIG. 3) and is located with an upper surface lying in the gutter and arranged to be drawn along it. Each belt (26) supports a row of closely spaced pots (10). The gutters (24) are situated with their end portions proximate to a belt conveyor (30) of transfer conveyor means (28) located transversely to the gutters (24). Each gutter is provided with a transponder (31) (not shown) similar to transponder (14) whereby each gutter is uniquely identifiable by the signal from its transponder.

Figure 4:
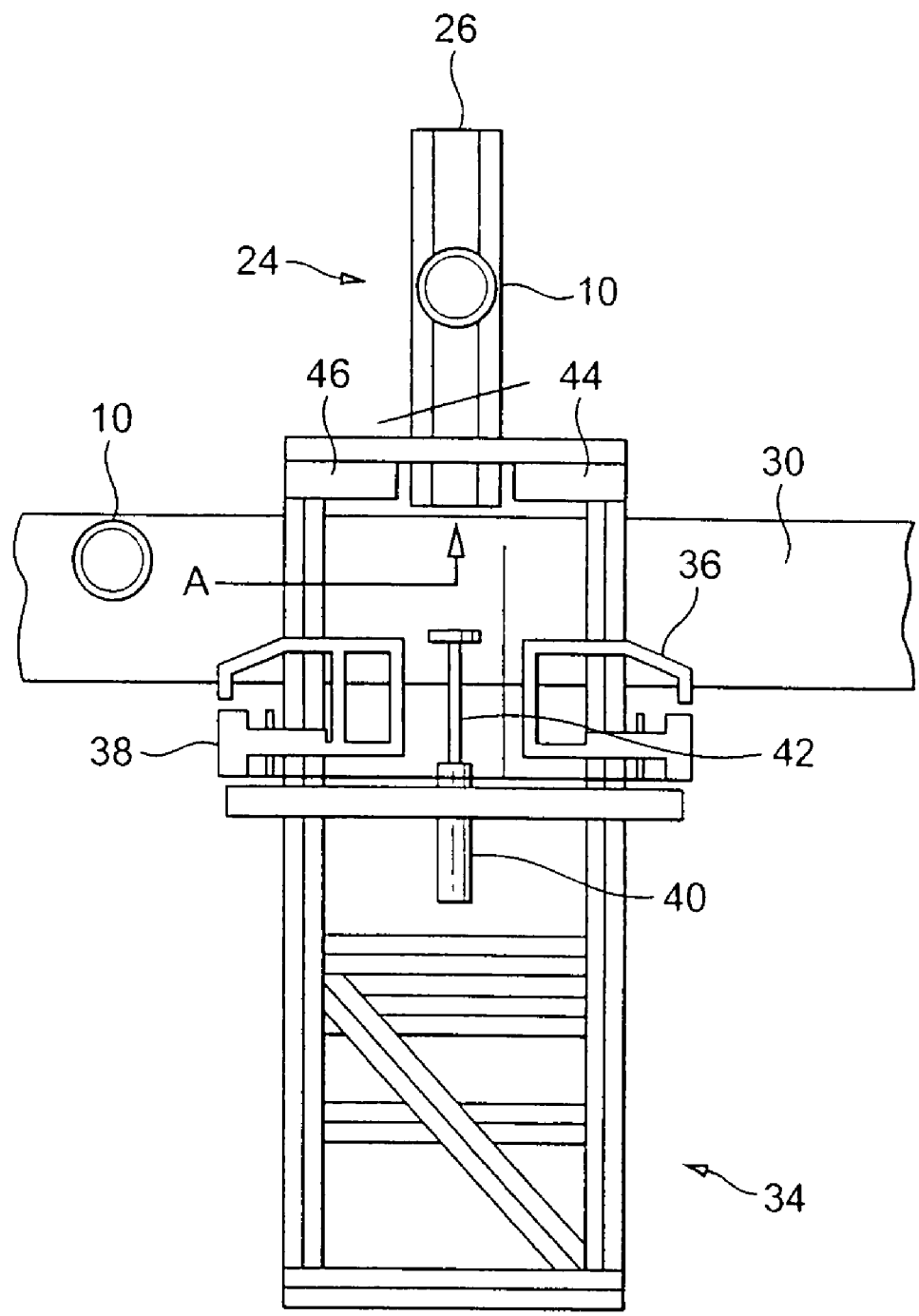
FIG. 4 is a schematic plan view of a motorized shuttle of the first illustrative apparatus.

Electrically operated shuttle robots (32, 34) are employed to actuate movement of the belts (26) in the gutters (24). The movement causes the pots to be transported to or from the belt conveyor (30). Motor means is provided for moving the belt conveyor (30) continuously. When a belt (26) is moved in its gutter in one direction, the row of pots supported on that belt is moved towards a transfer station at which an endmost pot of the row is transferred to the belt conveyor (30). When moved in the other direction the belt (26) moves the row of pots supported on that belt away from the belt conveyor (30), allowing space for a pot to be introduced to the end of that row. Each shuttle robot (32, 34) is arranged for movement along the belt conveyor (30) (FIG. 4) so that it may communicate with the gutters individually as desired. They are of similar construction and the shuttle robot (34) only is described here. Guide members (36, 38) are provided for guiding pots moving along the belt conveyor (30). A cylinder (40) of a pneumatically operated piston and cylinder device is mounted on the shuttle robot between the guide members (36, 38) and its piston (42) is arranged for movement horizontally across and above the belt conveyor (30). In its rest position as shown in FIG. 4, the piston (42) serves to arrest a pot delivered from a gutter by its belt (26). When it is desired to remove a pot from the belt conveyor (30), the piston (42) is actuated to push the pot and urge it into the selected gutter (22) in the path shown by arrow A in FIG. 4. The shuttle robot carries two rod shaped transponder antennae (44, 46) which are positioned each side of the shuttle robot and serve as transmitter aerials. Each transmitter sends radio waves towards the transponders (14). The small antenna of the transponder (14) captures this and uses the energy generated for its own response. The transponder chip recognizes the radio signal and transmits its unique identifier signal by sending information programmed in it as a simple unique code. The unique identifier signal is captured by one or more of the aerials (44, 46) of the transmitters, which sends this identifier to the computer means via decoders. The shuttle robot also carries a transponder reader (48) (not shown) for reading the signals from the transponders (31) associated with the gutters and these respond in a similar way to supply information to the computer means about the identity of the gutter in front of which the shuttle robots are standing thus specifying the precise location of each shuttle robot in relation to the gutters. The shuttle robot also sends to the computer means information concerning the operations which it performs, so that a history of its actions may be combined with other information supplied to the computer means. The information about which pot is passing a shuttle robot and the precise location of the shuttle robot is known and kept in the memory of the computer means enabling one to reconstruct an on-line overview of where each plant is or has been located on the transporter means.

This first illustrative apparatus is housed in a greenhouse and provides a warehousing system for plants which includes an on-line overview of the location of individual plants in the array of plants. In use of the apparatus one knows which plant passes which aerial at which time and what action was undertaken at that time i.e. whether filling or emptying gutters in order to have directional information on any plant movement. Grouping plants in batches facilitates the positioning of certain types or groups of plants in the greenhouse. Historical positional data combined with fertilizer and watering data enables an operator of the apparatus to keep track of the nutritional regime of every single plant in the array. The information also enables the operator to schedule all plant movements in the most efficient way.

The apparatus is arranged so that the shuttle robots are actuated in response to data contained in the database so as to move a pot from one location to another.

In addition, the first illustrative device may comprise a workstation at which an operation is performed on the plant or plants in the pot. Further, it may comprise means for performing the operation automatically, for example, means for sorting of plants according to specified characteristics, harvesting, imaging, packaging, photographing or pruning.

Figure 5:
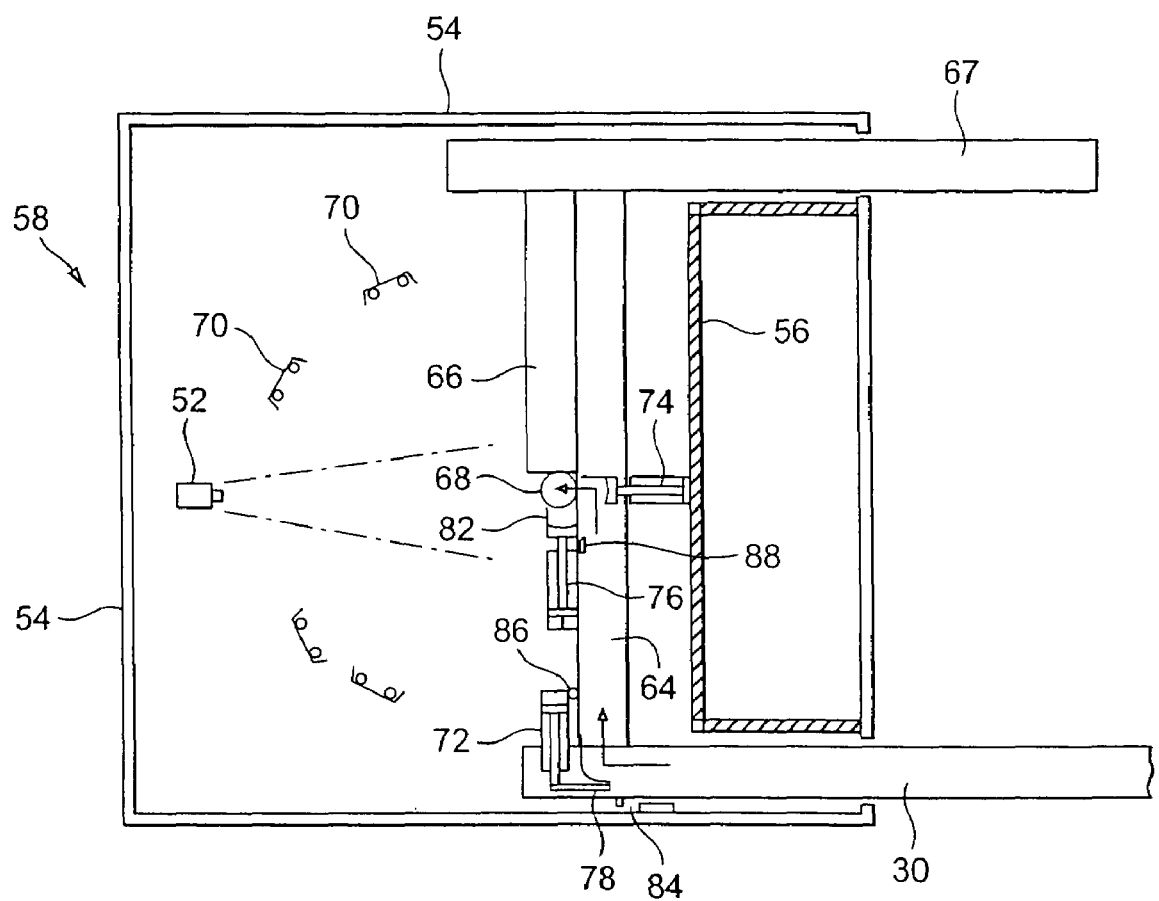
FIG. 5 is a schematic plan view of a workstation of the second illustrative apparatus.
Figure 6:
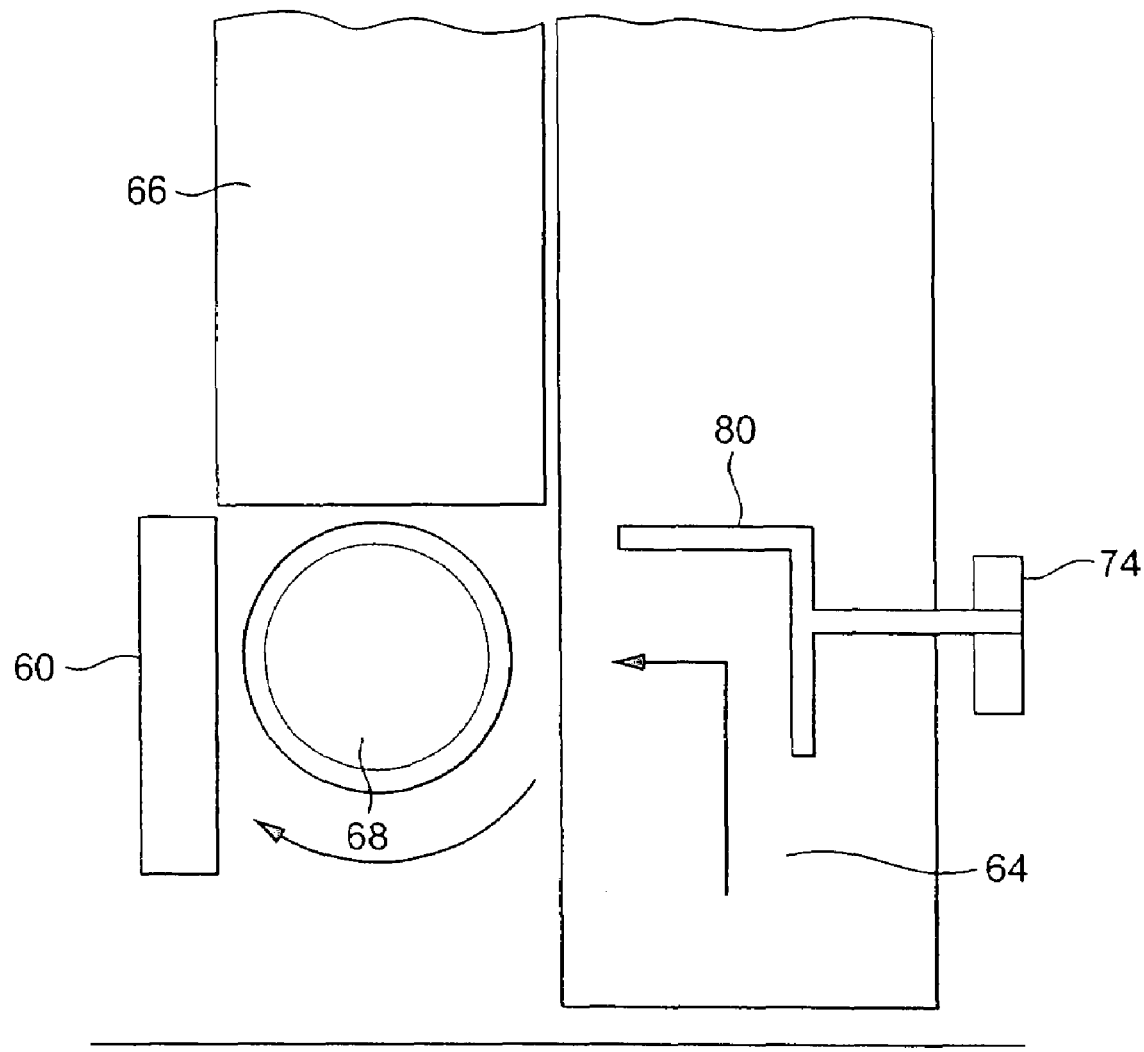
FIG. 6 is an enlarged view of a portion of the apparatus shown in FIG. 5.

The second illustrative apparatus shown in FIGS. 5 and 6 comprises a workstation (58) at which an imaging device (52) may be caused to carry out an imaging operation on a plant (12) in a plant pot (10) (FIG. 1) as they are fed one by one, for example from conveyor means of the first illustrative apparatus. A single transmitter (60) (FIG. 6) is employed at the workstation (58) (FIG. 5) for transmitting enquiry signals to which the transponder discs (14) respond. The apparatus also comprises means for recording the identifier signal as a digital output and computer means (not shown) to which the digital output is supplied for storage of the data in prescribed format in a database from which it may be manipulated to afford comparison of data related to the plants in the pots.

The workstation comprises an imaging cabinet having walls (54, 56) which serve to shield the interior from natural daylight. Light inside the imaging cabinet is provided by a standardized set of lamps (70) of which the light intensity can be controlled. The imaging device comprises two digital cameras disposed one above another and focused on the position occupied by a plant delivered to a rotatable work support in the form of a circular plate (68) adjacent which the transmitter is located. One camera has a 35 mm lens and is mounted 20 cm above the level of soil in the pot for observation of plants up to 36 cm high and the other has a 9 mm lens mounted 65 cm above the level of soil in the pot for observation of plants up to 135 cm high. A set of up to six images are taken as the pot is rotated through a predetermined angle of rotation.

The apparatus comprises transporter means (FIG. 5) by which the pots are supported and moved through the workstation one by one. The transporter means comprises a first belt conveyor (which is an extension of the belt conveyor (30) of the first illustrative apparatus), a second belt conveyor (64) running transversely of the first belt conveyor, a third belt conveyor (66) running parallel to the second belt conveyor (64) and a fourth belt conveyor (67) running parallel to the first belt conveyor (30).

Picking devices (72, 74, 76) are positioned to move pots from the belt conveyor (30) to the belt conveyor (64), from the belt conveyor (64) to the circular plate (68) and from the circular plate to the belt conveyor (66). Each picking device comprises a pneumatically operated piston and cylinder device of which the cylinder is secured to a frame of the apparatus. A curved arm (78) secured to the piston of the picking device (72) is positioned to be drawn across an end portion of the belt conveyor (30) to transfer a pot onto the belt conveyor (64). An |L| shaped arm (80) secured to the piston of the picking device 74 is positioned for movement across the belt conveyor (64) and serves to arrest movement of the pot and push it onto the circular plate (68). A |U| shaped arm (82) secured to the piston of the picking device (76) is arranged for movement to dislodge the pot from the circular plate onto the belt conveyor (66). An optical sensor (84) is positioned adjacent the picking device (72) detects the presence of a pot and stops its movement whilst a pot is in position on the circular plate (68). An optical sensor (86) positioned adjacent the picking device (72) detects pots passing on the belt conveyor (64) and is arranged to stop the belt conveyor (64) if this sensor is activated for more than a certain period of time commensurate with the passage of a properly oriented pot and thus stops the system if, for example, an overturned pot is passing this sensor (86). An optical sensor (88) is located adjacent the picking device (74) and serves to actuate the picking device (74) to push a pot from the belt conveyor (64) onto the circular plate (68).

The transmitter comprises a flat transponder antenna (60) fixed to the frame of the apparatus, adjacent the circular plate (68), between the plate and the imaging device (52). The antenna (60) extends no higher than a pot on the circular plate (68) so that it does not obstruct the image of the plant in the pot taken by the imaging device (52).

In use of the second illustrative apparatus, pots containing plants to be imaged are delivered to the belt conveyor (30) and transferred one by one to the belt conveyor (64) by operation of the picking device (78). The picking device (74) is operated to push the pot and its plant from the belt conveyor (64) onto the circular plate (68) and the plate rotates through 360°. Antenna (60) sends radio waves towards the transponder (14) in the pot as it reaches the plate (68). The small antenna of the transponder (14) captures this and uses the energy generated for its own response. The chip of transponder (14) recognizes the radio signal and transmits its unique identifier signal by sending information programmed in it as a simple unique code. The unique identifier signal is captured by the antenna (60) which sends this identifier to the computer means via decoders. The antenna (60) is mounted in such a way that it reads only the transponder (14) of a pot (10) positioned on the plate (68). The identifier of the transponder (14) is captured several times as the circular plate is rotated with the pot and plant supported thereon. Also, the reader of the transponder (60) sends a signal to the software system that controls the digital cameras in the imaging cabinet and activates the cameras to take a series of pictures. These pictures are processed on-line using imaging analysis software to extract information on the plants (e.g. height of the plants on the images, number of green pixels, etc.) and the processed data as well as the images are linked to the transponder unique identifier and downloaded to the computer means.

After the images have been captured, the picking device (76) pushes the pot from the circular plate onto belt conveyor (66) of the transporter means which transports the plants out of the imaging cabinet for transfer to the belt conveyor (67) and return to the gutters. The speed at which plants are handled in the imaging cabinet can be controlled by adjusting the speed of the conveyor belts and the picking devices.

The invention claimed is:

1. Apparatus suitable for use in conjunction with a container in which one or more plants is growing, the container having a associated with it a device for receiving an enquiry signal and automatically responding by transmitting an unique identifier signal wherein the enquiry and identifier signals are radio signals, the apparatus comprising:
   (a) a workstation at which an operation is automatically performed on the plant or plants or on the growing medium in the container.
   (b) means for transporting the container to the workstation, said means comprising a plurality of co-extensive storage transporters each providing support for a row of several containers, the storage transporters being disposed adjacent one another to support rows of containers in a horizontally disposed array and to co-operate with a transfer conveyor located adjacent and transversely to an end portion of each storage tranporter;
   (c) means for transmitting the enquiry signal;
   (d) means for recording the identifier signal as a digital output; and
   (e) means for storing the digital output as data in perscribed format in a database for manipulation to afford comparsion of the data related to the container.

2. Apparatus according to claim 1 wherein the means for transmitting the enquiry signal comprises a plurality of transmitters located in the storage transporters and each transmitting an unique enquiry signal.

3. Apparatus according to claim 2 wherein the means for storing the digital output is organizied to enable identification of the location of the container by reference to the enquiry and identifier signals and to information about the location of the transmitters.

4. Apparatus according to claim 3 comprising means for operating a storage transporter to move a row of containers supported thereon towards a first transfer station at which an endmost container of the row is transferred to the transfer conveyor, and means for moving the storage transporter to move the row of containers supported thereon away from a second transfer station.

5. Apparatus according to claim 4 comprising means for operating the transfer conveyor to move the container supported thereon to a second-transfer station or to a workstation.

6. Apparatus according to claim 4 or 5 wherein the means for operating a storage transporter and the means for operating the transfer conveyor are actuated in response to data contained in the database so as to move the container from the one location to another.

7. Apparatus according to claim 1 comprising means for performing an operation automatically on the plant or plants presented at the workstation.

8. Apparatus according to claim 7 wherein the means for performing an operation automatically on the plant or plants presented at the workstation is selected form the group consisting of means for sorting of plants according to specified characteristics, harvesting, imaging, packaging, photographing and pruning.

9. Apparatus according to claim 7 wherein transmission of the identifier signal of the container presented at the workstation actuates the means for performing the operation.

10. Apparatus according to claim 7 comprising camera means for performing said operation by obtaining one or more digital images of the plant or plants in the container present at the work station.

11. Apparatus according to claim 10 wherein the workstation comprises a work support mounted for rotation when a container is supported thereon and the images are obtained.

12. Apparatus according to claim 10 comprising algorithm means for tranposing the digital images into a form in which selected criteria of the plant or plants in the container may be evaluated.

13. Apparatus according to claim 7 further comprising means for recording that the operation has been performed and supplying the record in digital format to the computer database.

14. Apparatus is according to claim 7 comprising a conveyor on which a container is transported towards the workstation and means for urging the container from the conveyor into the position at the workstation.

15. Apparatus according to claim 14 comprising a conveyor on which a container may be carried away from the workstation and means for urging the container from the workstation onto this conveyor.

16. Apparatus according to claim 1 wherein the container contains a single plant.

17. The apparatus of claim 1, wherein data in said database is derived from recording characteristics of a plant presented at an operating station, said plant having an associated device for receiving an enquiry signal and automatically responding thereto by transmitting an unique identifier signal, passing the container comprising said plant automatically to a workstation at which there is located means for transmitting the enquiry signal, causing the identifier signal to actuate means for performing an operation on the plant or plants in the container and transferring the identifier signal and information concerning the operation on the plant or plants in the container as digital output to a database for recording in prescribed format for manipulation according to desired characteristics.

* * * * *

UNITED STATES PATENT AND TRADEMARK OFFICE
CERTIFICATE OF CORRECTION

PATENT NO. : 7,506,472 B2  
APPLICATION NO. : 10/740028  
DATED : March 24, 2009  
INVENTOR(S) : Frederik Leyns et al.

Page 1 of 1

It is certified that error appears in the above-identified patent and that said Letters Patent is hereby corrected as shown below:

In Claim 1, in column 8, line 18, "having a associated with it a device for receiving an enquiry" should read --having associated with it a device for receiving an enquiry--.

In Claim 3, in column 8, line 44, "storing the digital output is organizied to enable identification" should read --storing the digital output is organized to enable identification--.

In Claim 5, in column 8, line 57, "ported thereon to a second-transfer station or to a workstation." should read --ported thereon to a second transfer station or to a workstation.--.

In Claim 14, in column 10, line 2, "into the position at the workstation." should read --into position at the workstation.--.

Signed and Sealed this

Twenty-third Day of June, 2009

JOHN DOLL  
*Acting Director of the United States Patent and Trademark Office*